United States Patent [19]
Kohno et al.

[11] Patent Number: 5,866,193
[45] Date of Patent: Feb. 2, 1999

[54] APPARATUS FOR ENCAPSULATING SEED BY GEL

[75] Inventors: Yasushi Kohno; Takamichi Maejima; Kazushi Nakatsukasa, all of Himeji, Japan

[73] Assignee: Agritecno Yazaki Co., Ltd., Hyogo-ken, Japan

[21] Appl. No.: 977,753

[22] Filed: Nov. 25, 1997

[30] Foreign Application Priority Data

Aug. 6, 1997 [JP] Japan ................................. 9-212073

[51] Int. Cl.⁶ .................................................. A01N 3/00
[52] U.S. Cl. ............................ 427/4; 427/430.1; 118/13; 118/22; 118/23; 118/26; 118/30; 118/66; 118/407; 118/423
[58] Field of Search .................. 118/13, 22, 23, 118/26, 30, 66, 407, 423; 427/4, 430.1

[56] References Cited

U.S. PATENT DOCUMENTS 2,406,437  8/1946  Petrovic ...................................... 118/22

FOREIGN PATENT DOCUMENTS 8-149906  6/1996  Japan .
9-14971   6/1997  Japan .

*Primary Examiner*—Laura Edwards
*Attorney, Agent, or Firm*—Knobbe, Martens, Olson & Bear, LLP

[57] ABSTRACT

An apparatus for encapsulating seed by gel comprising a seed supplying portion and a processing portion, wherein seed has fallen from a hopper of a seed supplying portion are carried to a plurality of processing nozzles of a processing portion, for encapsulating seed by gelling. A supplying portion comprising the hopper filled with seed, a carrying device disposed below the hopper for arranging seed in correspondence with the number of processing nozzle of the processing portion, and switching devices disposed respectively at the end portions of seed carriage lanes formed by the carrying device so many as the processing nozzles. The carrying device comprising a box-shaped trough, partitions disposed at the upstream portion of the trough for restriction of the height of the flowing of seed, partitions for dividing the flowing of seed into streams so many as the processing nozzles, and a vibrator disposed below the trough.

14 Claims, 10 Drawing Sheets

APPARATUS FOR ENCAPSULATING SEED BY GEL

BACKGROUND OF THE INVENTION

1. Field of the Invention

The present invention relates to an apparatus for encapsulating seed by gel, which is particularly applied to production of large seed encapsulated by gel on a plurality of lines continuously.

2. Related Art

The Japanese Laid Open Gazette Hei. 8-149906 describes a well-known conventional technique with respect to encapsulating seed by gel by use of gelling mixed with nutrition, medicine and the like, wherein seed are inserted one after another into a single nozzle so as to be encapsulated by gel. Encapsulated seed in gel produced by use of the technique are supplied enough for the generality of farmers, however, cannot overtake the desired sum for a nursery company, an agricultural cooperative association, an extensive farmer and the like. Thus, such a well-known technique for continuous production of encapsulated seed in gel that seed are inserted into a plurality of nozzles simultaneously as described in the Japanese Laid Open Gazette Hei. 9-149710, for example, is used conventionally.

However, the conventional gel encapsulating apparatus of the above prior arts aim at processing seed like paddy rice having diameters between about 7 and 12 mm. It cannot process larger seed than those, because there occasionally happens that large seed cannot be suspended in a seed supplying hopper, some of them cannot be absorbed by suction of a vacuum pump, or some of those absorbed by the vacuum pump fall by empty weight on the way of carriage thereof. Furthermore, in such a construction for encapsulating seed by gel as to comprise absorbing nozzles and processing nozzles disposed in a plurality of lines, the absorbing nozzles absorb and carry seed to the processing nozzles simultaneously in parallel, however, even if only one of the absorbing nozzles has failed to absorb a seed, all of the absorbing nozzles are obliged to repeat their movement of absorption simultaneously again, thereby waste the time for carriage.

An object of the present invention is to provide an apparatus which can encapsulate seed by gel steadily, even if the seed are such large seed as to have diameters larger than 12 mm, so as to enable continuous production of encapsulated seed in gel.

SUMMARY OF THE INVENTION

An apparatus for encapsulating seed by gel of the present invention comprises a seed supplying portion and a processing portion for encapsulating seed by gelling including a plurality of processing nozzles disposed in a row. Said seed supplying portion comprises a hopper filled with seed, a carrying device disposed below the hopper, forming seed carriage lanes in correspondence with the number of the processing nozzles, so as to carry seed, which have fallen from the hopper, into the processing nozzles, and a plurality of switching devices. Each of the switching devices is disposed at the end position of each of the seed carriage lanes of the carrying device.

Furthermore, the carrying device comprises a box-shaped trough, a partition disposed at the upstream side on the trough for restrict the height and the movement of flowing of seed, partitions dividing the flowing of seed, so as to form the seed carriage lanes corresponding with the number of the processing nozzles, and a vibratory member disposed below the trough.

Furthermore, each of the switching devices comprises a switching plate disposed respectively at the seed carriage lanes in an exit of the carrying device, and an actuator is provided for the opening and closing operation of each switching plate.

Otherwise, an apparatus for encapsulating seed by gel of the present comprises a seed supplying portion including a hopper filled with seed and a plurality of seed detecting portions disposed an exit of the seed supplying portion, and a processing portion for encapsulating seed by gelling including a plurality of processing nozzles disposed in a row. Seed which have fallen from the hopper fall into the processing nozzles. Each of the seed detecting portions detects the falling of each seed into each of the processing nozzles, so that only the processing nozzle, into which each seed has fallen, is operated for a processing of encapsulating seed by gel.

DETAILED DESCRIPTION OF THE PREFERRED EMBODIMENT

Figure 1:
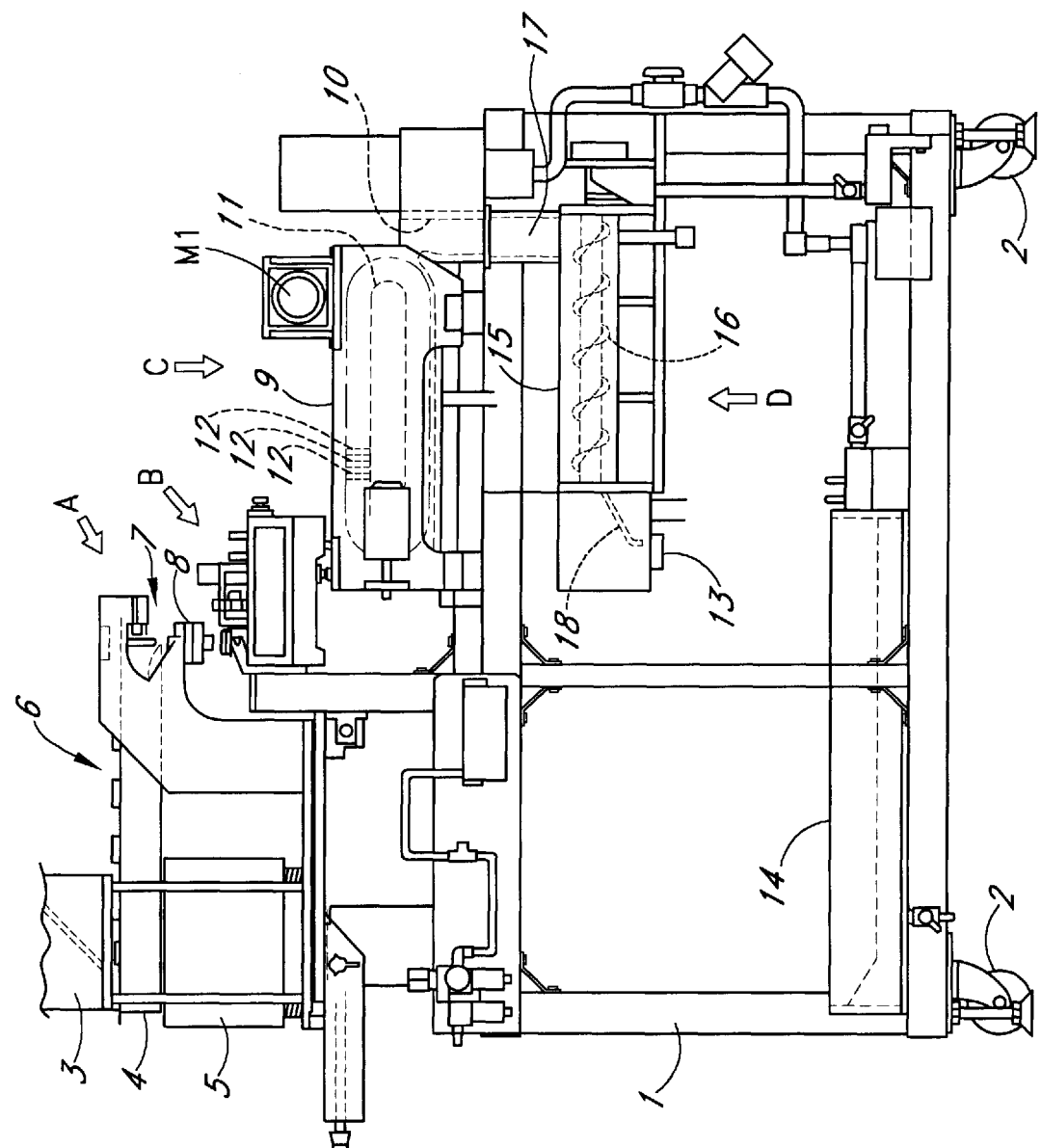
FIG. 1 is a front view of a gel encapsulating apparatus of the present invention.
Figure 2:
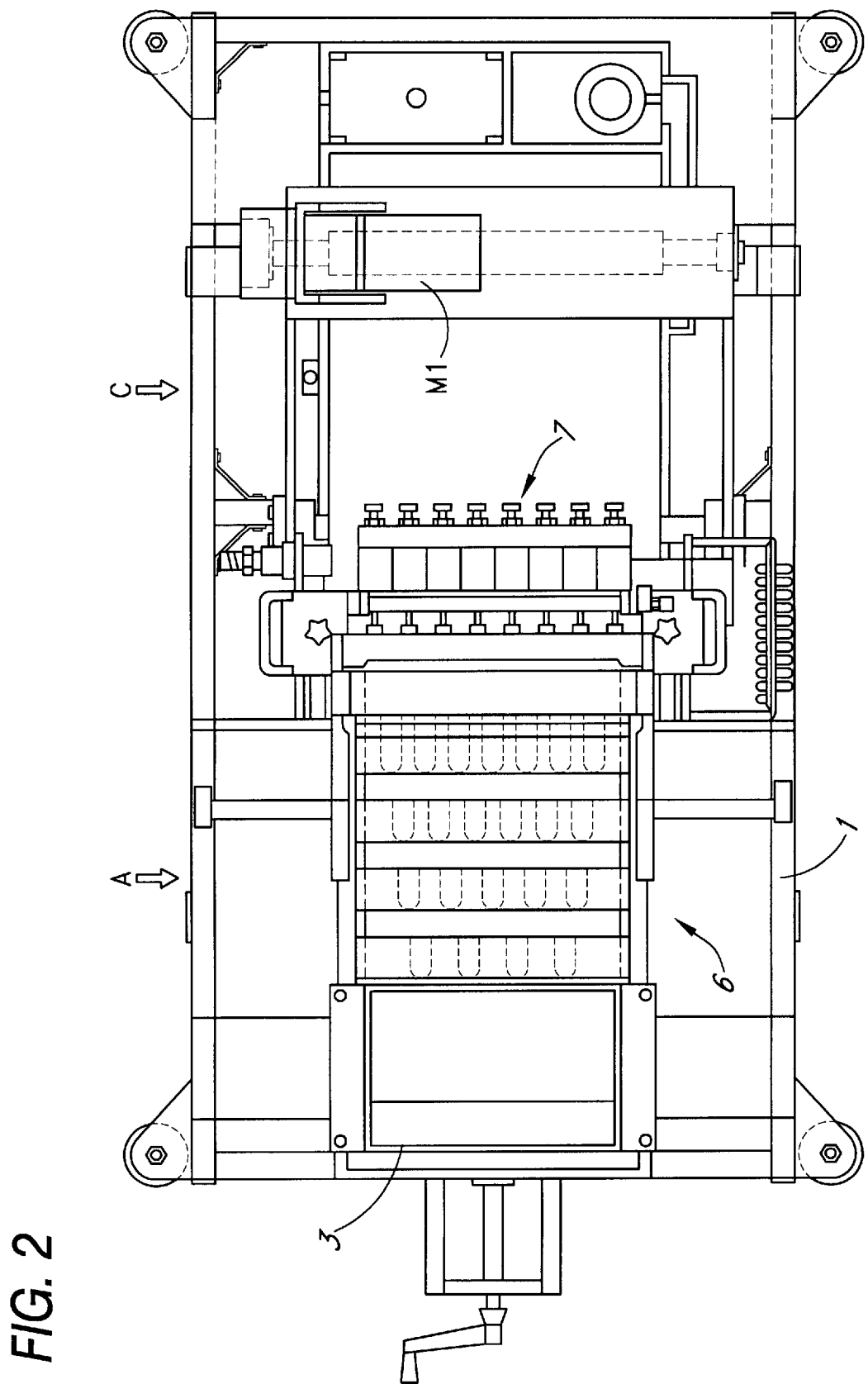
FIG. 2 is a plan view of the same.
Figure 3:
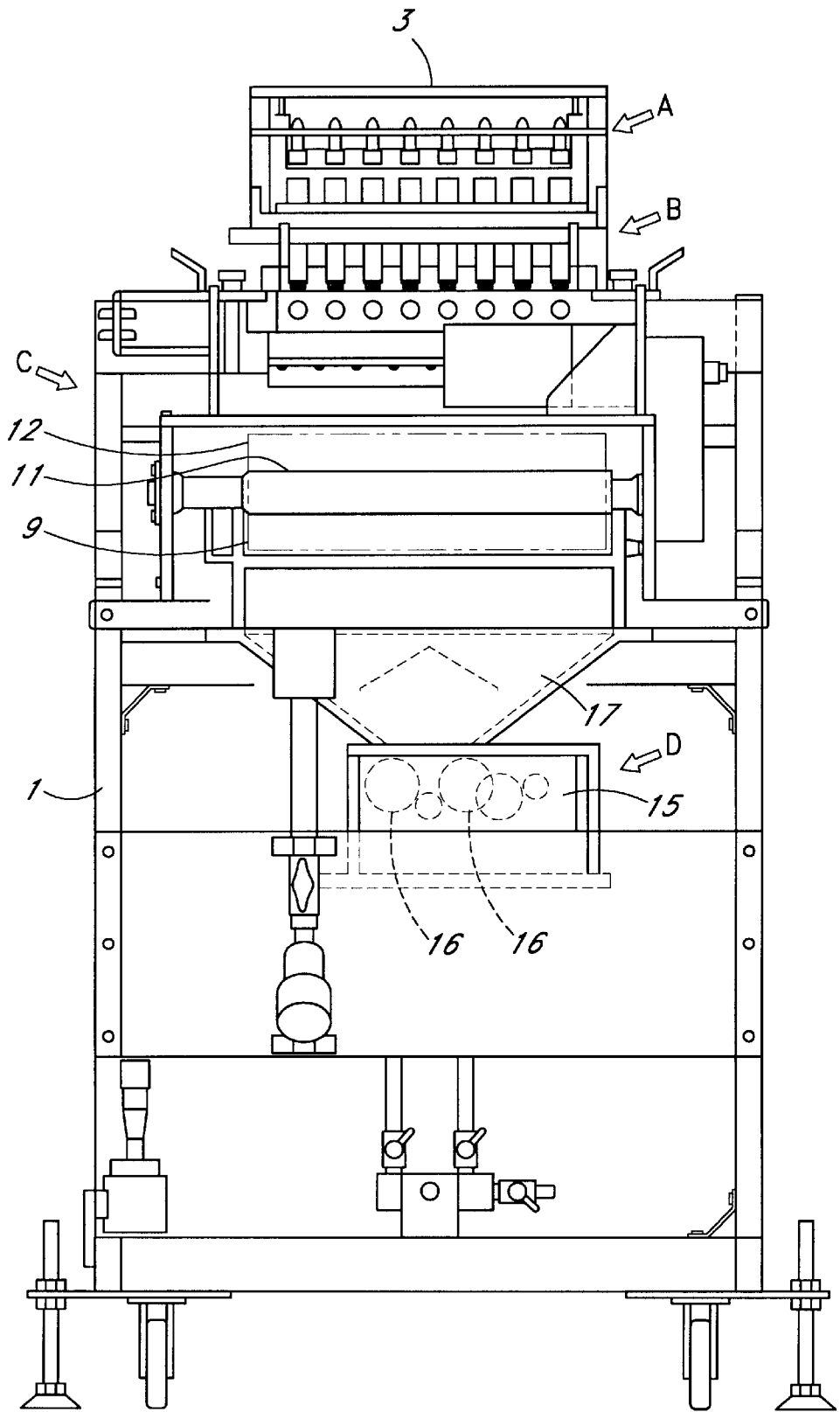
FIG. 3 is a side view of the same.

The whole construction of a gel encapsulating apparatus of the present invention will be explained in accordance with FIGS. 1, 2 and 3. The gel encapsulating apparatus comprises a seed supplying portion A, a processing portion B, a hardening portion C and a washing portion D, which are supported by a frame 1. Frame 1 is provided at the lower portion thereof with casters 2, thereby being carried easily. Seed supplying portion A to be discussed below comprises a hopper 3, a carrying device 6, switching devices 7 and seed detecting portions 8. Processing portion B to be discussed below, which is disposed above the center of frame 1, receives seed S from seed supplying portion A, encapsulates seed S by gelling so as to form into a predetermined size, and drops them.

Hardening portion C comprises a hardening tank 9 filled with hardener, which is spread at right side below processing portion B, and forms a falling hole 10 at the right end thereof opposite to processing portion B. A conveyor belt 11 is disposed above hardener tank 9. Paddles 12 project perpendicularly to the direction of conveyance of conveyor belt 11 from the external surface of conveyor belt 11 at regular intervals. Conveyor belt 11 is driven by a motor M1.

Thus, seed S encapsulated with unhardened gelling are dropped from processing portion B into hardening tank 9, so as to contact with the hardener are conveyed in hardening tank 9 by paddles 12 of rotated conveyor belt 11 and fall through falling hole 10 to washing portion D. The gelling encapsulating seed S are hardened during a period between falling thereof into hardening tank 9 and falling thereof into washing portion D. The hardening period can be adjusted by adjustment of the speed of conveyance by controlling the rotational frequency of motor M1, so that the degree of hardness of the gelling can be adjusted.

Washing portion D is disposed between the lower portion of falling hole 10 in frame 1 and the center thereof. A discharging hole 13 is formed at the portion of washing portion D disposed at center of frame 1. A product container 14 is disposed below discharging hole 13. Washing portion D comprises a washing water tank 15 and a screw 16. Screw 16 is disposed laterally in washing water tank 15 between falling hole 10 and discharging hole 13 and is driven by a motor (not shown). A funneled guide member 17 is disposed between falling hole 10 and the upstream end of washing water tank 15. A strainer 18 is disposed at the upstream side of discharging hole 13.

In such a construction, washing water tank 15 is filled with washing water, and seed S encapsulated by gelling hardened to a predetermined degree of hardness are provided from falling hole 10 through guide member 17 and are soaked in the water. Seed S encapsulated by gel are carried to discharging hole 13 by rotated screw 16. During the period of the carriage thereof, the hardener which has stuck to the external surface of the gelling encapsulating each seed S is washed out, so as to stop hardening of the gelling. Excessive water is removed from seed S encapsulated by gel by strainer 18 and seed S encapsulated by gel fall through discharging hole 13 into product container 14, so as to be contained.

Next, explanation will be given on seed supplying portion A as a principal part of the present invention. A hopper 3 are longitudinally disposed above the left side (right side in FIG. 4) of carrying device 6 and forms at the lower portion thereof an opening 3a. Drawing devices 4 are disposed respectively under hoppers 3. One of drawing devices 4 will be described according to FIG. 4. Carrying device 6 comprises a trough 4, a vibratory member 5 and partitions 20, 21, 22, 23, 24 and 25 disposed within trough 4. Vibratory member 5 is an electromagnetic type which is so constructed that a pulsating current is given to an electromagnet so as to vibrate it. However, vibratory member 5 may be a weight eccentrically rotated by a motor or may use a piezoelectric element or the like. Seed S are carried rightward by driven vibratory member 5.

Figure 7:
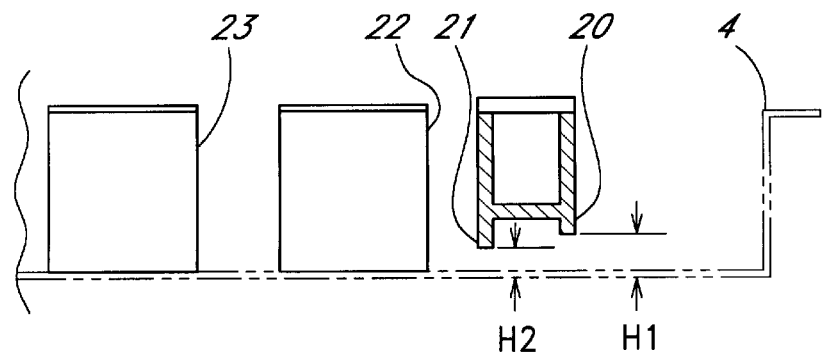
FIG. 7 is a partially sectional view of partitions.

Trough 4 is formed into a box opening at the upper and right portion thereof. A handle 19 can move trough 4 laterally by rotational operation thereof, so as to adjust the lateral position of trough 4, and a knob 40 can move the left side (right side in FIG. 4) of trough 4 vertically by rotational operation thereof, so as to change an angle of inclination of trough 4. Within trough 4, at the left portion thereof are disposed partitions 20 and 21, which restrict the height and movement of the flowing of seed S, at the right side of the center thereof are disposed partitions 22, 23, 24 and 25, which divide and arrange the flowing of seed S, and at the right end thereof are disposed switching devices 7. Partitions 20 and 21 are longitudinally disposed in parallel with each other on the right hand of opening 3a of hopper 3. There are slits of predetermined heights between the lower ends of partitions 20 and 21 and the bottom surface of trough 4, so as to make seed S pass therethrough. To be detailed in accordance with FIG. 7, a height H1 between the lower end of partition 20 and the bottom surface of trough 4 is larger than a height H2 between the lower end of partition 21 and the bottom surface of trough 4. Height H2 is a little larger than the diameter of seed S. Accordingly, during the flowing of seed S, partition 20 restricts the quantity of flowing seed S in some degree, and partition 21 makes a single seed S pass through in the vertical direction of the flowing, so as to prevent seed S from flowing over one another.

Figure 8:
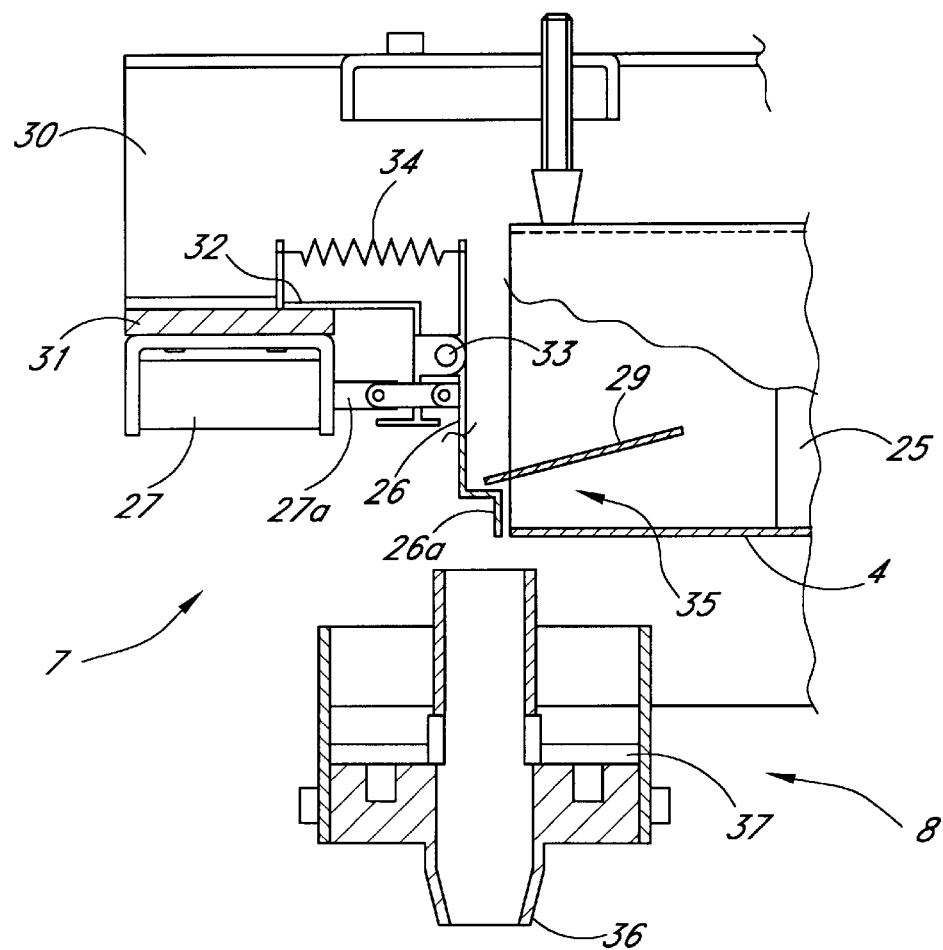
FIG. 8 is a sectional rear view of a switching device.
Figure 9:
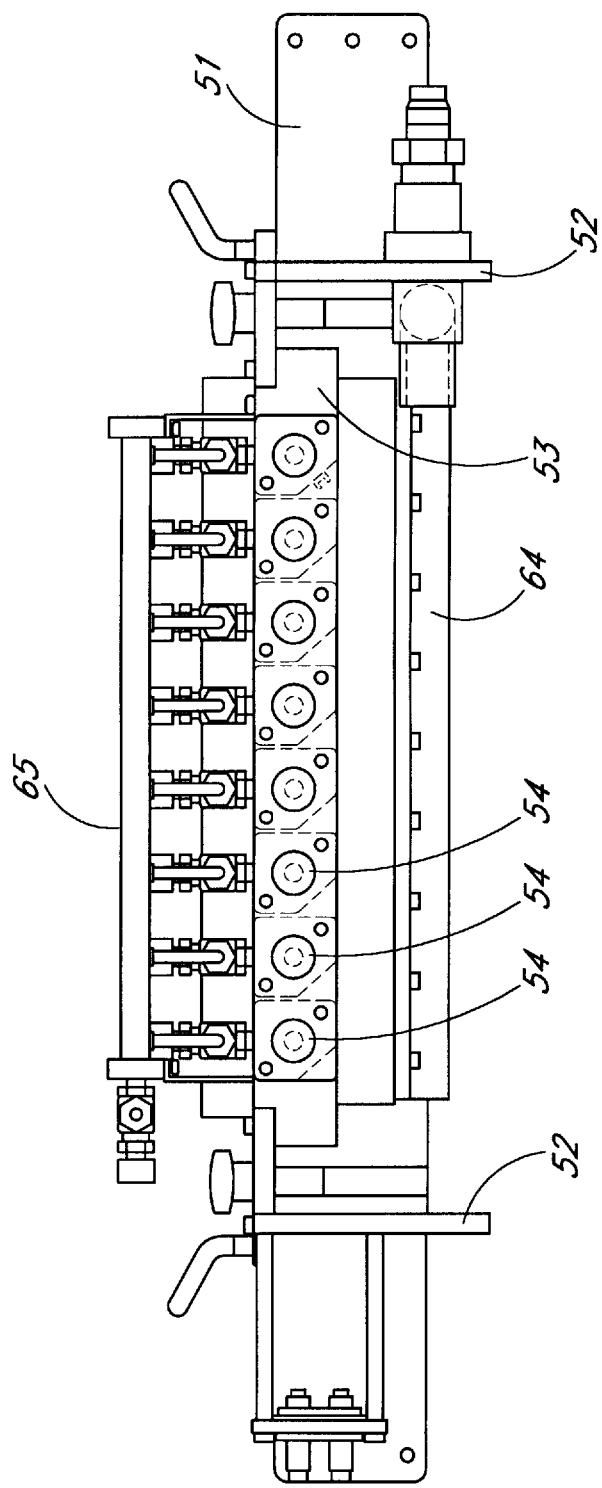
FIG. 9 is a rear view of a processing portion.
Figure 10:
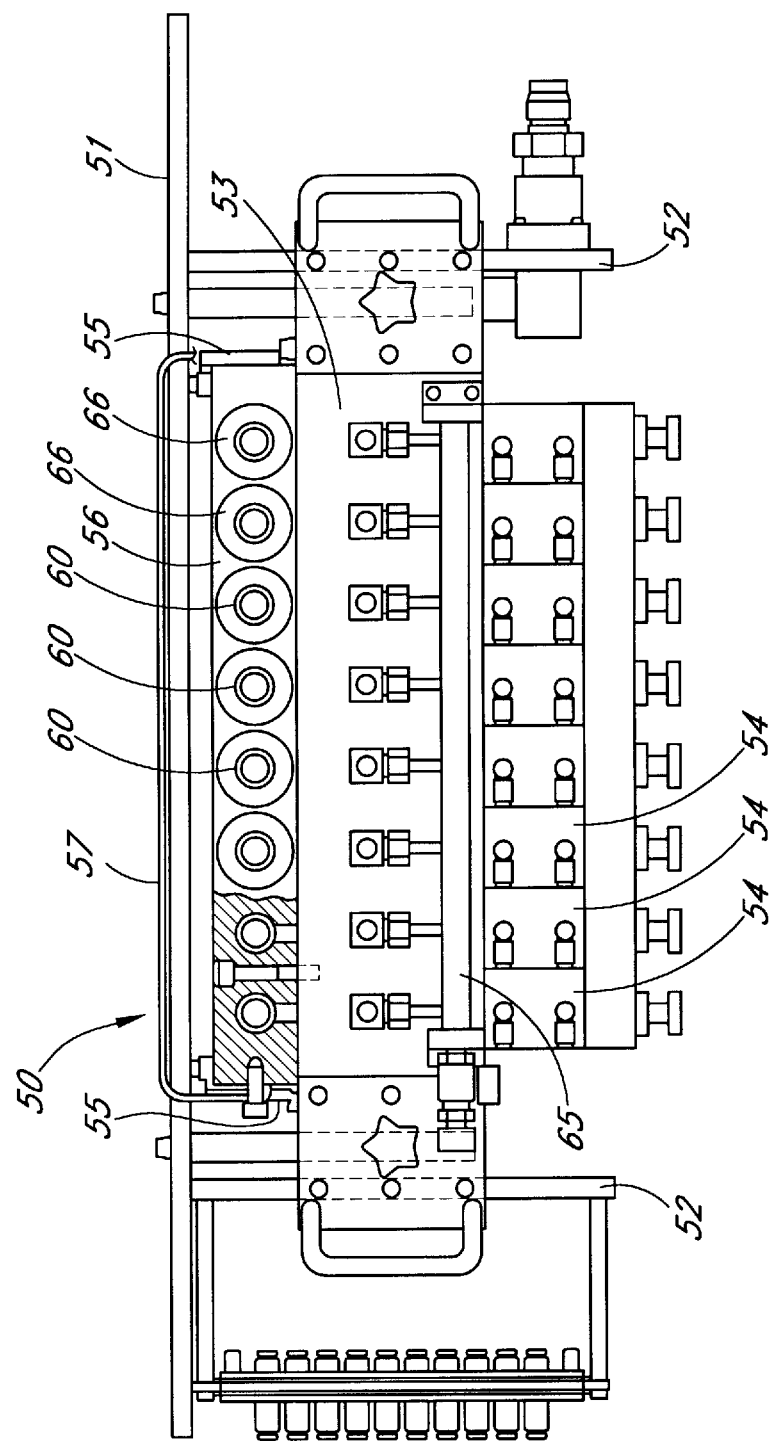
FIG. 10 is a plan view partly in section of the same.
Figure 11:
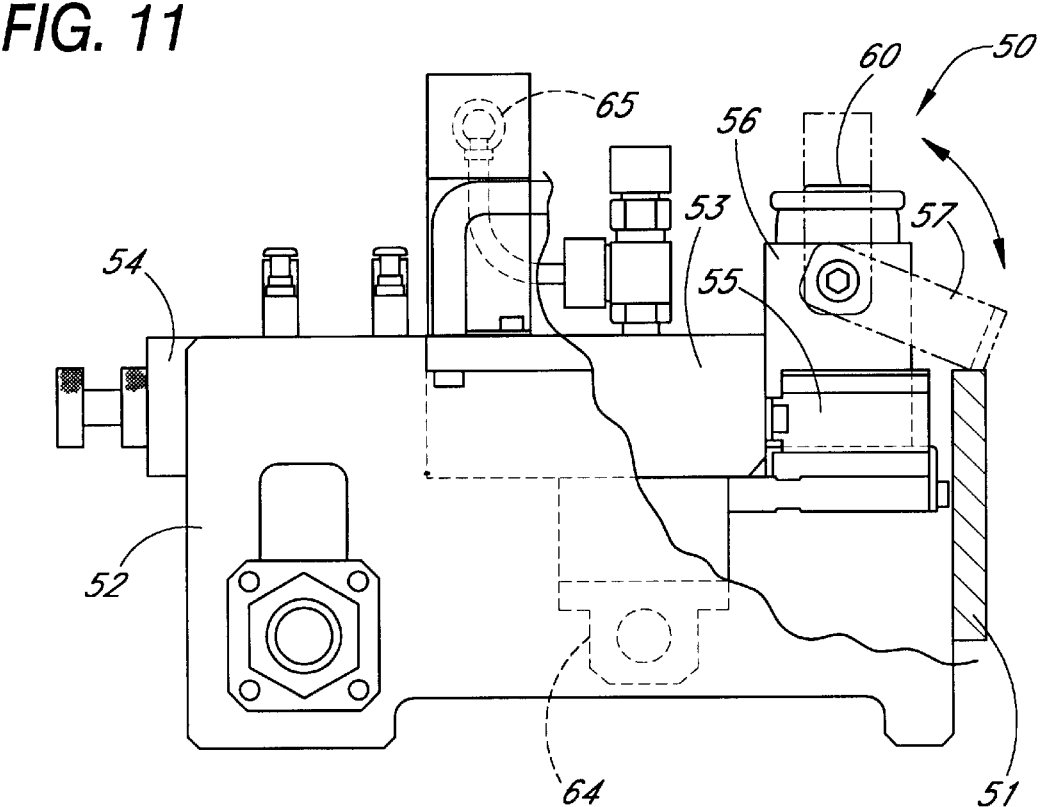
FIG. 11 is a rear plan view of the same.

Partitions 22, 23, 24 and 25 are vertically erected so as to be laterally disposed in parallel with each other in the longitudinal rows thereof. Four partitions 22 are erected at regular intervals in parallel with each other in the longitudinal row thereof, so as to divide the flowing of seed S into five streams. Five partitions 23 are elected at regular intervals in parallel with each other in the longitudinal row thereof, so as to divide the five streams of seed S into six streams. Six partitions 24 are erected at regular intervals in parallel with each other in the longitudinal row thereof, so as to divide the six streams of seed S into seven streams. Seven partitions 25 are erected at regular intervals in parallel with each other in the longitudinal row thereof, so as to divide the seven streams of seed S into eight streams. The interval between each pair of partitions 25 and 25 or between partition 25 and a front or rear side plate of trough 4 has such a width as to make seed S pass therethrough one after another in a row. Also, as shown in FIG. 8, at the exit of trough 4 is disposed a restraint plate 29 which restricts the height of exhausted seed S, so as to transmit seed S one by one to each switching device 7. Thus, in this embodiment, seed S are arranged into eight seed carriage lanes so as to be processed continuously. However, the number of the seed carriage lanes for processing is not limited. The arrangement and number of partitions may correspond with the required number of the seed carriage lanes for the next processing.

Figure 4:
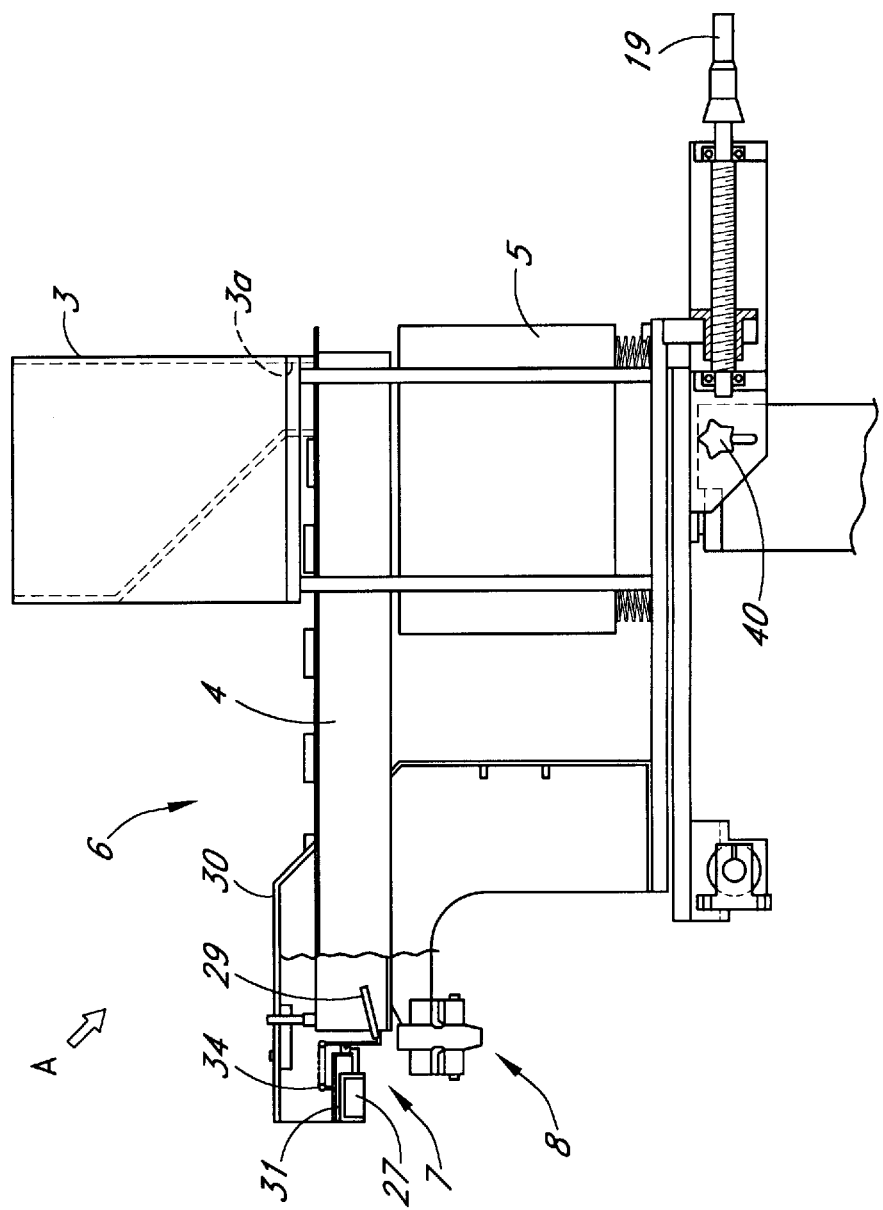
FIG. 4 is a rear view of a seed supplying portion.
Figure 5:
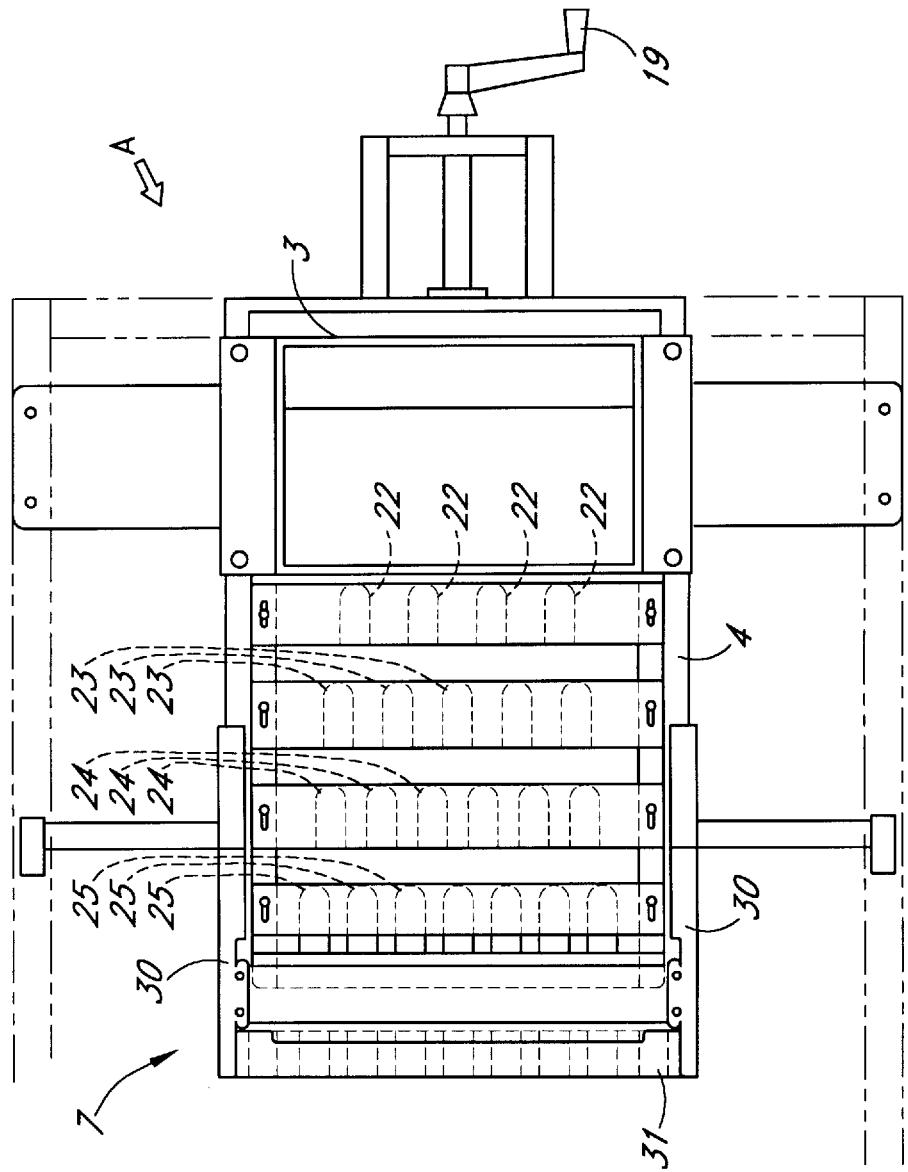
FIG. 5 is a plan view of the same.
Figure 6:
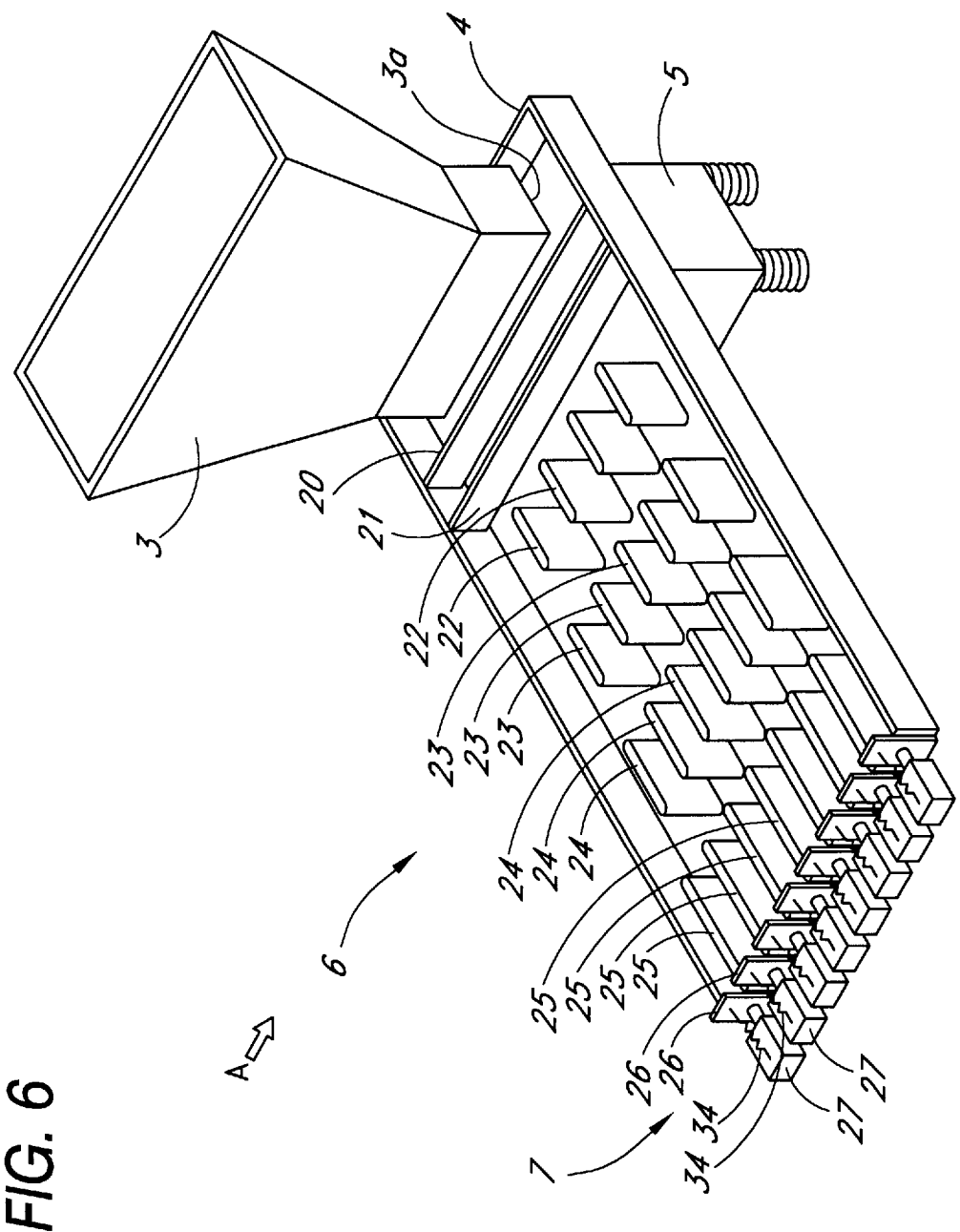
FIG. 6 is a perspective view of the same.

As shown in FIGS. 4, 5 and 8, each of switching devices 7 comprises a switching plate 26 and an actuator 27 made of a solenoid, a cylinder, a motor or the like. An attachment plate 31 is spread between the right ends of a pair of side plates 30, which are fixed on front and rear sides on the right side portion of trough 4. Eight actuators 27 are attached in a row to attachment plate 31 and are connected with a control circuit. A gate plate 32 is fixed to attachment plate 31 and supports a pivotal shaft 33 horizontally. Vertical intermediate portions of switching plates 26 are supported rotatably around pivotal shaft 33. Eight switching plates 26 are disposed correspondingly with the above mentioned eight carriage lanes. A pressed spring 34 is interposed between each switching plate 26 and gate plate 32, biassing the lower portion of switching plate 26 toward the opening position.

An end of an operative rod 27a of each actuator 27 is rotatably supported by the portion of switching plate 26 lower than the pivotal portion thereof. The lower end portion of each switching plate 26, which is cranked in a front view, is a gate portion 26a, being able to close each exit 35 surrounded by restraint plate 29, the bottom surface of trough 4 and partitions 25.

According to such a construction, when each actuator 27 is operated for the extensional operation of operative rod 27a thereof, switching plate 26 is rotated so as to close exit 35. When the extensional operation of actuator 27 is stopped, operative rod 27a contracts, and accordingly, switching plate 26 is rotated leftward (in FIG. 8) by biassing of pressed spring 34 so that exit 35 is opened and a single seed S falls through opening exit 35. On falling of the single seed S, actuator 27 is extensionally operated so as to close exit 35. However, an extended spring may replace pressed spring 34. In this case, exit 35 is opened by the extensional operation of actuator 27.

Seed detecting devices 8 are disposed respectively below exits 35. Each seed detecting device 8 comprises supplying nozzle 36 and seed detecting sensor 37 which is made of a photoelectric switch, a supersonic sensor or the like. Seed detecting portions 8 are disposed respectively in correspondence with the eight seed carriage lanes. The upper end of each vertical pipe-shaped supporting nozzle 36 is disposed under each exit 35, so as to enable seed S to fall into supplying nozzle 36. The lower end thereof is disposed above each processing nozzle 50 of processing portion B to be discussed below. Each seed detecting sensor 37 is connected with a control circuit, so as to detect whether a single seed S passes trough the inside of supplying nozzle 36.

Figure 12:
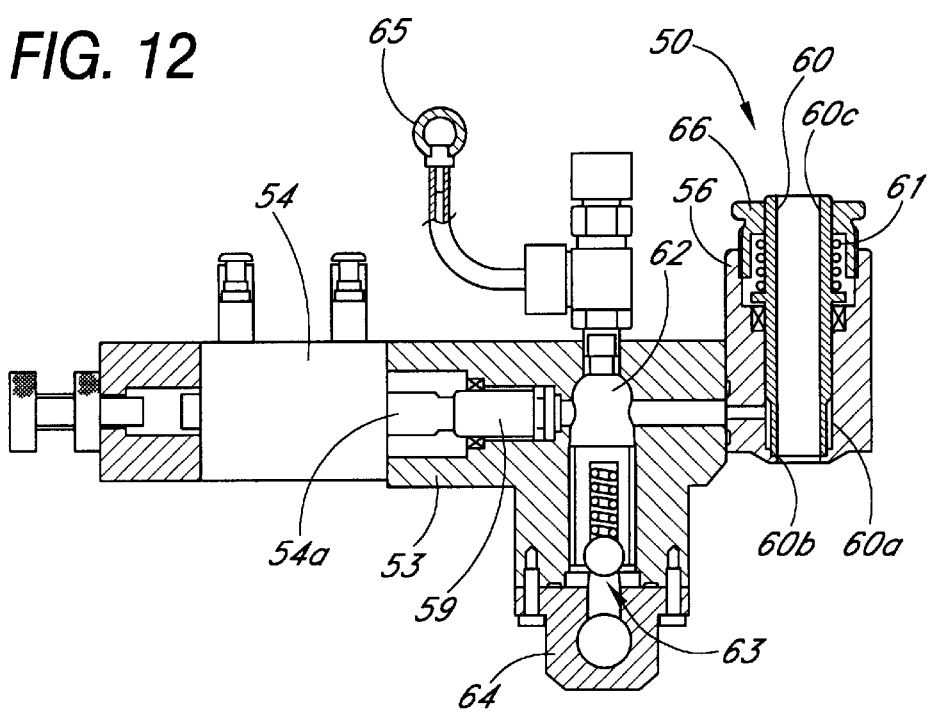
FIG. 12 is a sectional rear view of the same.

Next, explanation will be given on the construction of processing portion B. As shown in FIGS. 9, 10, 11 and 12, in processing portion B, an attachment plate 51 is longitudinally fixed onto frame 1, a pair of side plates 52 project leftward (in FIG. 11) from the front and rear ends of attachment plate 51, and a gel compressing case 53 is spread between side plates 52. Eight cylinders 54 are disposed in a row at the left side (in FIG. 11) of gel compressing case 53. As shown in FIG. 12, utmost ends of piston rods 54*a* of cylinders 54 are connected respectively with pistons 59 disposed within gel compressing case 53. A pair of holders 55 project rightward (in FIG. 11) from the front and rear ends of gel compressing case 53.

The construction of each processing nozzle 50 will be explained. A plunger case 56 is removably attached to holders 55. A reference numeral 57 designates a handle easing carriage of removed plunger case 56. Plunger case 56 is pierced by eight vertical through holes in parallel with each other. The front and rear ends of each of the through holes are disposed correspondingly with the position of each supplying nozzle 36. Eight nozzle plungers 60 are vertically inserted respectively into the through holes. As shown in FIG. 12, each cylindrical nozzle plunger 60 has a through hole 60*c* along the axis thereof. A flange portion is provided on the circumference of the intermediate portion of nozzle plunger 60. A spring 61 is wound around nozzle plunger 60 above the flange portion thereof, and engages with a cap 66 screwed into plunger case 56, so as to bias nozzle plunger 60 downwardly. Nozzle plunger 60 forms at the lower portion thereof an edge portion 60*a*. The portion of nozzle plunger 60 lower than edge portion 60*a* has a smaller diameter, so as to form a gap between the external surface thereof and the internal surface of the through hole of plunger case 56. Edge portion 60*a* constitutes a surface for receiving the pressure of gelling which enters the gap. The lower end of nozzle plunger 60 constitutes a valve portion 60*b* which closes the lower end of the through hole of plunger case 56. Thus, each processing nozzle 50 is constructed as such.

Otherwise, within gel compressing case 53 are provided gel chambers 62, which contain encapsulating medicine (gelling), in communication with a gel tank (not shown) through check valves 63, a manifold 64, a hose pipe and the like. Each gel chamber 62 is communicated with each cylinder chamber containing piston 59, and with the gap as a pressure receiving chamber formed at the lower portion of nozzle plunger 60. It is also communicated at the upper portion thereof with a ventilator pipe 65.

In such a construction, when each piston 59 enters gel chamber 62 by the extentional operation of each cylinder 54, the interior of each gel compressing chambers 62 is compressed, so as to compress each pressure receiving chamber of nozzle plunger 60, and edge portion 60*a* receives the pressure so as to be lifted, thereby elevating nozzle plunger 60. Accordingly, valve portion 60*b* is opened, so that gel flows down therethrough respectively. When the gel of a predetermined quantity has been discharged, nozzle plunger 60 descents by biassing of springs 61, so as to close valve portion 60*b*. Each opening space under the lower end of each nozzle plunger 60 is filled with the remaining gel, which has flown down from the pressure receiving chamber, forming a gel membrane. Furthermore, when piston 59 leaves gel chamber 62 by the contractional operation of cylinder 54, the interior of gel chamber 62 is decompressed, so that check valve 63 is opened, thereby feeding gel chamber 62 by gel from a gel tank.

Simultaneously, each switching plate 26 is opened during a predetermined period by turning off actuator 27 and afterward, it is closed, so that a single seed S falls through each exit 35. As a result, eight seed S fall from exits 35 (the exit of trough 4) at one period. Each seed detecting portion 8 detects the falling of seed S from each exit 35, and each seed S falls through through hole 60*c* along the axis of each nozzle plunger 60 and on the gel membrane. According to detection of the falling of seed S by seed detecting portion 8, cylinder 54 of only processing nozzle 50, into which seed S has fallen, extends so as to thrust piston 59 into gel chamber 62, so that gel flows down as the above mentioned, and falls including each seed S and an air bubble. Gel encapsulating seed is spheroidized by surface tension during the falling thereof, falls into hardening tank 9, so as to be hardened into a predetermined hardness, and is washed by water.

Each processing nozzle 50 repeats processing continuously by such operations and a plurality of processing nozzles 50 are operated simultaneously in parallel, however, processing nozzle 50, into which seed S has fallen, of them only processes. Accordingly, encapsulated seed in gel can be mass produced steadily.

The present invention so constructed as the above brings the following effects:

In an apparatus for encapsulating seed by gel comprising a seed supplying portion and a processing portion for encapsulating seed by gelling including a plurality of processing nozzles disposed in a row, since the seed supplying portion comprises a carrying device disposed below the hopper, forming seed carriage lanes in correspondence with the number of the processing nozzles, so as to carry seed, which have fallen from the hopper, into the processing nozzles, and a plurality of switching devices disposed respectively at the end positions of the seed carriage lanes of the carrying device, seed can reach each of the switching devices from the hopper by the carrying device and can fall one by one to the each processing nozzles of the processing portion. Particularly, in case of carrying large seed, the carrying device does not have such a construction as to absorb seed, so that seed can be carried one by one more steadily to the processing portion.

Also, in such an apparatus for encapsulating seed by gel, since the carrying device comprises a box-shaped trough, a partition disposed at the upstream portion of the trough for restrict the height and the movement of flowing of seed, partitions dividing the flowing of seed, so as to form the seed carriage lanes corresponding to the number of the processing nozzles, and a vibratory member disposed below the trough, the seed can be scattered on the trough by vibration of the vibratory member, be restrained into a stream having a single seed disposed in vertical direction, and be arranged into rows having seed disposed one after another in each of the rows, thereby enable processing nozzles disposed in a row to be supplied with seed one by one.

Also, in such an apparatus for encapsulating seed by gel, since each of the switching devices comprises a switching plate disposed at each of the seed carriage lanes in an exit of the carrying device and an actuator provided for the opening and closing operation of the switching plate, seed can fall one by one into each processing nozzle merely by the opening and closing operation of each switching plate disposed at the exit of each seed carriage lane, as a result, seed can be supplied into the processing nozzles by such a simple construct. Furthermore, each switching plate disposed at each seed carriage lane can be individually operated, so that the number of the seed carriage lanes can be changed or regulated easily in correspondence with an obstruction of every seed carriage lane or with a trouble of every processing nozzle.

Also, in an apparatus for encapsulating seed by gel comprising a seed supplying portion and a processing portion for encapsulating seed by gelling including a plurality of processing nozzles disposed in a row, since the seed supplying portion comprises a plurality of seed detecting portions disposed an exit of the seed supplying portion, which detects the falling of each seed into each of the processing nozzles, so that only the processing nozzle, into which each seed has fallen, is operated for a processing of encapsulating seed by gel, production of gel encapsulating no seed can be avoided, thereby improving the rate of production of encapsulated seed in gel and avoiding using excessive gelling.

What is claimed is:

1. An apparatus for encapsulating plant seeds with gel, comprising:

a plurality of processing nozzles for encapsulating each seed with gel;

a carrying device comprising a plurality of seed carriage lanes for carrying seeds to the respective processing nozzles, each seed carriage lane having an end disposed above the processing nozzle; and a plurality of switching devices, each disposed at the end of each seed carriage lane facing a processing nozzle, for closing and opening each seed carriage lane to the processing nozzle to allow each seed to be individually fed into the processing nozzle.

2. An apparatus according to claim 1, wherein said carrying device comprises a box-shaped trough, a partition for restricting the movement of the flow of seeds, partitions for dividing the flow of seeds to form the seed carriage lanes, and a vibrator for vibrating the box-shaped trough.

3. An apparatus according to claim 1, wherein each switching device comprises a switching plate for closing and opening each seed carriage lane, and an actuator for closing and opening the switching plate.

4. An apparatus according to claim 1, further comprising a plurality of seed detectors each for detecting the seeds passing therethrough, each seed detector disposed downstream of the switching device and upstream of the processing nozzle, wherein the processing nozzles are operated only when the respective seed detectors detect the seeds.

5. An apparatus according to claim 1, wherein each processing nozzle comprises a valve that closes when encapsulating with gel each seed accommodated therein and opens when discharging the encapsulated seed.

6. An apparatus according to claim 1, further comprising a hardening device disposed downstream of the processing nozzle, for receiving encapsulated seeds discharged from the processing nozzles and for hardening the gel-encapsulated seeds.

7. An apparatus according to claim 6, further comprising a washing device disposed downstream of the hardening device, for washing the hardened encapsulated seeds.

8. A method for encapsulating plant seeds with gel, comprising the steps of:

carrying plant seeds to a plurality of processing nozzles by using a carrying device comprising a plurality of seed carriage lanes;

closing and opening each seed carriage lane to the processing nozzle to allow each seed to be individually fed into each processing nozzle, by using a plurality of switching devices, each disposed at an end of each seed carriage lane facing the processing nozzle; and encapsulating each seed in the processing nozzle.

9. A method according to claim 8, wherein said carrying device comprises a box-shaped trough, a partition to restrict the movement of the flow of seeds, partitions to divide the flow of seeds to form the seed carriage lanes, and a vibrator to vibrate the box-shaped trough.

10. A method according to claim 8, wherein each switching device comprises a switching plate to close and open each seed carriage lane by using an actuator.

11. A method according to claim 8, further comprising detecting the seeds passing through respective seed detectors, each seed detector disposed downstream of the switching device and upstream of the processing nozzle, wherein the processing nozzles are operated only when the respective seed detectors detect the seeds.

12. A method according to claim 8, wherein each processing nozzle comprises a valve that closes when encapsulating with gel each seed accommodated therein and opens when discharging the encapsulated seed.

13. A method according to claim 8, further comprising receiving encapsulated seeds discharged from the processing nozzles and hardening the gel-encapsulated seeds.

14. A method according to claim 13, further comprising washing the hardened encapsulated seeds.

* * * * *